United States Patent [19]

Brandin

[11] 4,049,233
[45] Sept. 20, 1977

[54] DEVICE FOR ESTABLISHING AND BREAKING A FLUID COMMUNICATION

[75] Inventor: Johan A. I. Brandin, Norrkoping, Sweden

[73] Assignee: Stal Refrigeration AB, Norrkoping, Sweden

[21] Appl. No.: 728,124

[22] Filed: Sept. 30, 1976

[30] Foreign Application Priority Data

Oct. 3, 1975 Sweden .............................. 7511100

[51] Int. Cl.² .......................................... F16K 31/126
[52] U.S. Cl. ................................. 251/61.1; 277/34.3; 285/97
[58] Field of Search ......................... 285/97; 251/61.1; 277/34.3, 34.6

[56] References Cited

U.S. PATENT DOCUMENTS

| | | | |
|---|---|---|---|
| 2,231,282 | 2/1941 | Norris | 277/34.6 |
| 3,731,939 | 5/1973 | Wright et al. | 285/97 |
| 3,810,665 | 5/1974 | Rodgers | 285/97 |
| 3,881,686 | 5/1975 | Hirmann | 251/61.1 |
| 3,942,756 | 3/1976 | Brumm | 251/61.1 |

*Primary Examiner*—Robert I. Smith
*Attorney, Agent, or Firm*—Cyrus S. Hapgood

[57] ABSTRACT

First and second walls form first and second openings, respectively, which face each other in spaced, substantially coaxial relation. A device surrounding the first opening, for establishing and breaking fluid communication between the openings, comprises an inflatable ring which, when inflated, seals against the second wall around the second opening to complete a fluid flow path between the openings, and a circular body located in said flow path coaxially of the ring. When deflated, the ring bears sealingly against said body to prevent flow through the first opening.

3 Claims, 5 Drawing Figures

DEVICE FOR ESTABLISHING AND BREAKING A FLUID COMMUNICATION

The present invention relates to an arrangement for establishing and breaking a fluid communication between two spaces located at a distance from each other and provided with openings which face each other in substantially coaxial relation, one of the openings being surrounded by a device which is operable to seal axially around the other opening and which comprises means arranged to open for a fluid flow, when the said communication is established, and to shut off the fluid flow when the said communication is broken.

Such connecting devices are used, for example, in ships for transporting air-cooled cargo containers, each container being connectable to a cold air aggregate by means of two connecting devices, one of the connecting devices supplying cooled air to the container and the other connecting device bringing return air from the container back to the cold air aggregate. The connecting devices are arranged in vertical rows in the hold of the ship, and the containers are stacked upon each other (guided by vertical guides) so that their cold air openings will be positioned in front of the connecting devices. The connecting devices must not be damaged by the lowering of the containers into the hold or by the lifting of the containers from the hold. Therefore, the connecting devices heretofore have been arranged to be in a retracted position when the cold air aggregate is not connected to the containers. A free horizontal distance between the connecting device and the container of about 100 mm is considered necessary to enable the container to be moved vertically relative to the connecting device without the connecting device being damaged. In order not to waste cold air, the connecting device has been provided heretofore with a valve for shutting off the connecting device when it is not connected to a container.

A connecting device of the kind set forth above is disclosed in German Offenlegungsschrift No. 2,113,325. This prior connecting device comprises a stationary tubular means and a tubular menas which is movable towards the container, both means being connected by a bellows-formed means. A butterfly valve is rotatably journalled in the movable tubular means. When the movable tubular means is pushed out, the butterfly valve is automatically opened by a mechanism located between the two tubular means. This prior connecting device has a complicated structure and is therefore expensive to produce. The significance of this expense is apparent from the fact that a ship for transporting cooled containers today can load up to 1,000 containers, for which 2,000 connecting devices are required.

Another prior connecting device, disclosed in the French Pat. No. 69.37099, comprises an inflatable ring which, when inflated, expands toward the container into sealing contact around its cold air opening. The construction is simple, but it lacks a valve for shutting off the cold air flow.

The principal object of the present invention is to provide a connecting device which overcomes these disadvantages of the above-mentioned prior devices.

A connecting device made according to the invention comprises a ring which in a known manner is inflatable for sealing around the second opening, and a circular body located in the fluid flow path in coaxial relationship with the ring, the ring being constructed so that in its deflated state it seals against said body and thereby shuts off the fluid flow.

Compared to the connecting device according to the German Offenlegungsschrift No. 2,113,325, the connecting device of the present invention is considerably simpler and less expensive. Compared to the connecting device according to the French Pat. No. 69.37099, the necessary valve for shutting off the cold air flow is provided as an additional element of the present invention.

An embodiment of a connecting device according to the invention is described below in connection with the attached drawings, in which FIG. 1 is a longitudinal sectional view of a connecting device with a closed cold air passage and with its free end located at a distance from a cold air opening of a container;

Figure 1:
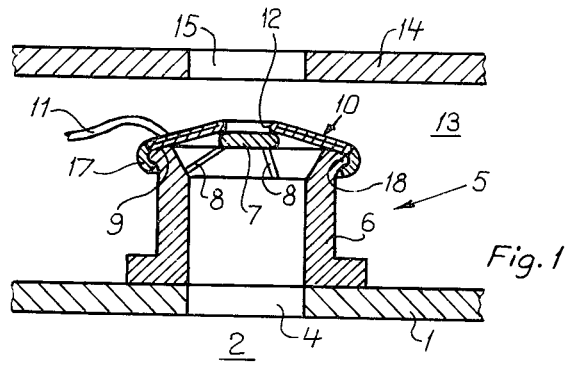

As shown in the drawings, a stationary wall 1 is arranged in the hold of a ship. Inside the wall 1 is a space 2 which communicates with a refrigeration plant (not shown) for supplying cooled air to the space 2 or for discharging air from the space 2. In the wall 1 is an opening 4. A connecting device 5 is arranged at the opening 4 and comprises a collar 6. A circular body 7 is arranged at the free end of the collar 6, the body 7 being coaxial with the collar 6 and held at a distance from the inner wall of the collar 6 by means of legs 8. A rubber ring 10 is arranged at the free end 9 of the collar 6, the ring 10 being inflatable through a tube 11. The ring 10 is formed and attached to the collar 6 so that when the ring is deflated, its inner circumference 12 bears upon and seals against the body 7, thereby preventing communication between the space 2 inside the wall 1 and the space 13 outside the wall 1.

At a distance from the deflated ring 10 shown in FIG. 1 is a wall 14 of a container, which is coolable by cold air. There is an opening 15 in the wall 14 for supplying cold air to the container or for discharging air from the container.

Figure 2:
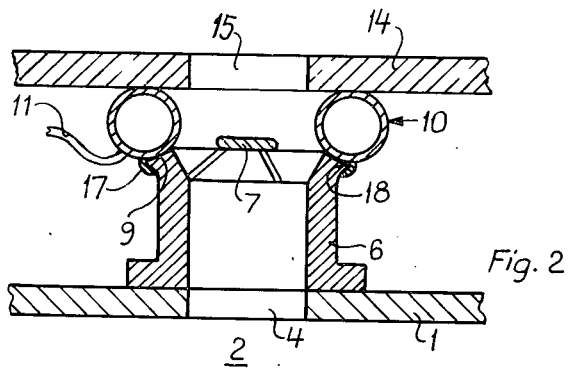
FIG. 2 is a similar view showing the connecting device of FIG. 1 connected to the container.

The space 2 is brought into communication with the container by inflating the ring 10. When inflated (FIG. 2), the ring 10 will widen in the direction towards the wall 14 to seal against the wall, simultaneously as its circumference widens, so that the ring leaves the body 7 and opens the communication between the space 2 and the container 14. When deflated, the ring 10 by itself returns to the retracted position shown in FIG. 1 and thus shuts off the communication between the space 2 and the container.

Figure 3:
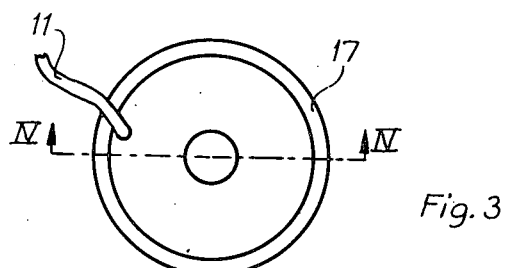
FIG. 3 is a plan view of an example of an inflatable ring which is a part of the connecting device.
Figure 4:
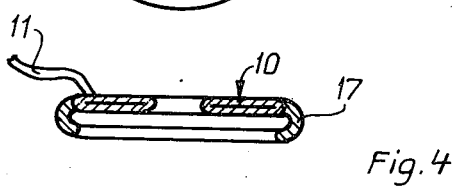
FIG. 4 is a sectional view of the ring taken on line IV—IV in FIG. 3.
Figure 5:
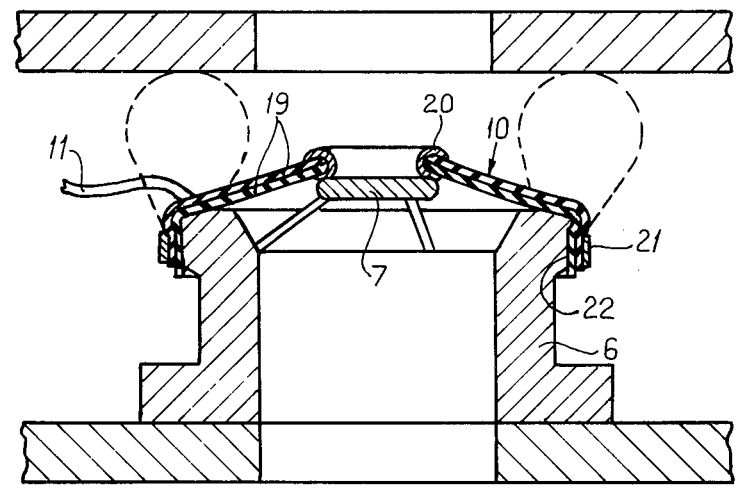
FIG. 5 is a view similar to FIG. 1 showing a connecting device with another example of an inflatable ring.

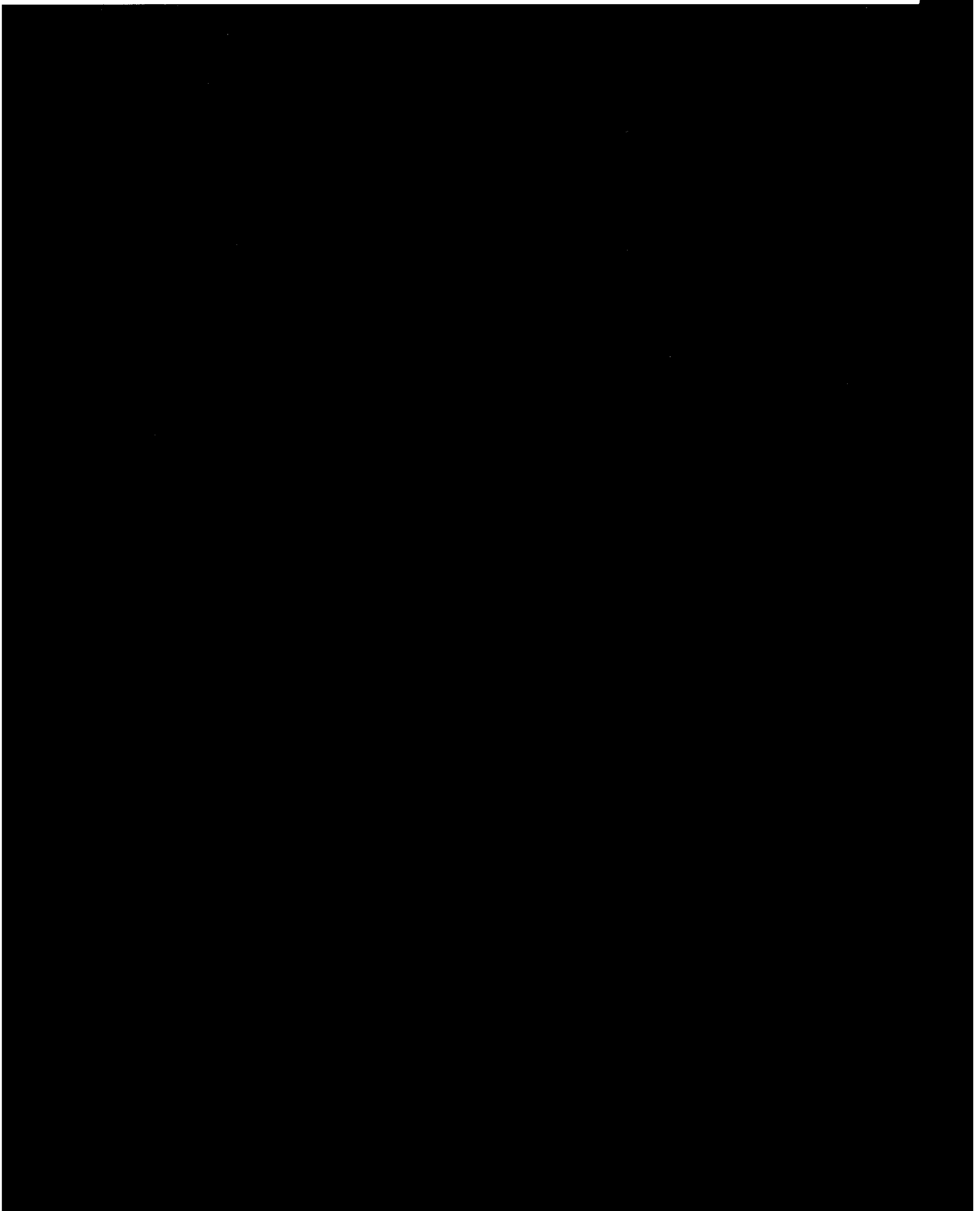

The ring 10 is held on the end 9 of the collar 6 by means of a collar 17 of rubber which is vulcanized to the ring along its outer circumference. The collar 17 is pulled over a radially protruding annular rim 18 of the collar 6. When detached (FIGS. 3 and 4), the ring 10 has a substantially planar form. The body 7 is arranged in such an axial position relative to the end 9 of the collar 6, and the wall of the ring 10 is given such a thickness, that the desired sealing against the body 7, through the elastic force from the ring 10, is obtained when the ring is deflated.